Aug. 5, 1958 F. D. JONES 2,845,932
HUSKER HAVING EAR HOLDING POCKETS
Filed Feb. 2, 1956 3 Sheets-Sheet 1
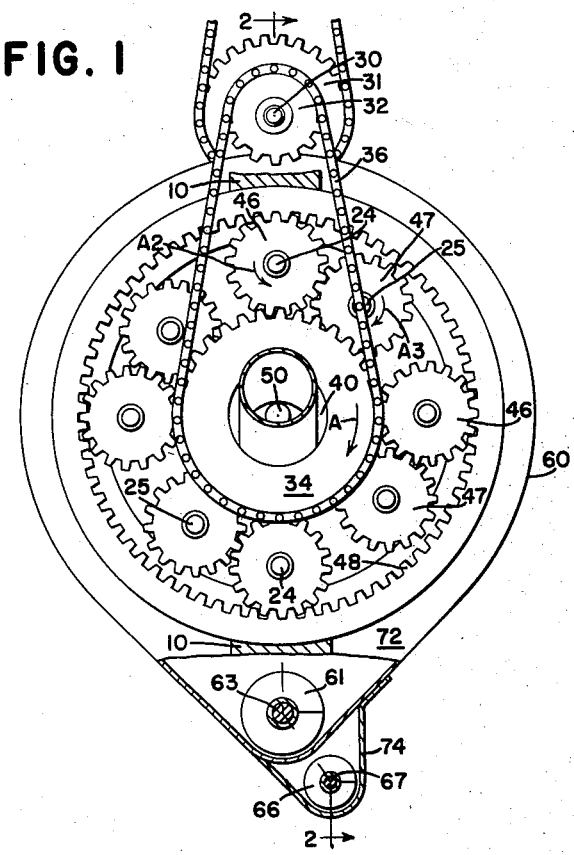
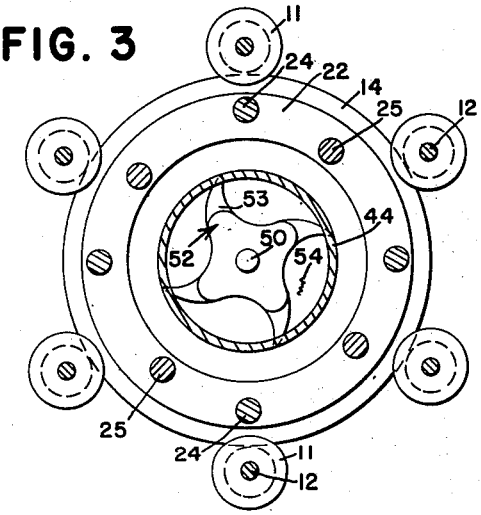
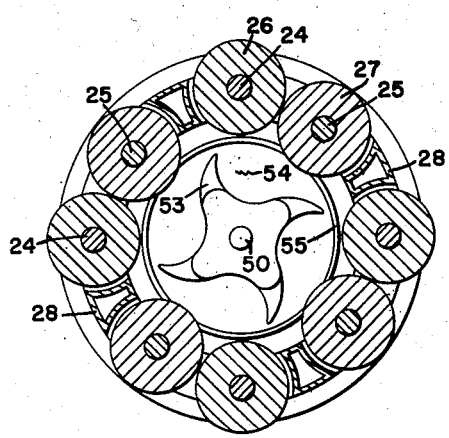
INVENTOR.
FRANK D. JONES
ATTORNEYS Aug. 5, 1958  F. D. JONES  2,845,932
HUSKER HAVING EAR HOLDING POCKETS
Filed Feb. 2, 1956  3 Sheets-Sheet 2

INVENTOR.
FRANK D. JONES
ATTORNEYS

Aug. 5, 1958 F. D. JONES 2,845,932
HUSKER HAVING EAR HOLDING POCKETS
Filed Feb. 2, 1956 3 Sheets-Sheet 3

INVENTOR.
FRANK D. JONES

ATTORNEYS

United States Patent Office 2,845,932
Patented Aug. 5, 1958

2,845,932

HUSKER HAVING EAR HOLDING POCKETS

Frank D. Jones, Moline, Ill., assignor to Deere & Company, Moline, Ill., a corporation of Illinois Application February 2, 1956, Serial No. 563,017

12 Claims. (Cl. 130—5)

This invention relates to a corn husking mechanism of a new and novel nature which may be incorporated in a corn harvester or may operate as a separate unit.

One of the great disadvantages of the present day husking mechanism is that a percentage of ears of corn, small as it is, will not have the husks removed when they pass through the husking mechanism. In the more common type of husking mechanisms, there is provided a plurality of laterally disposed husking rolls which are fed unhusked ears of corn at one end to be discharged in a husked condition at the opposite end. There is normally a certain amount of hesitation to the movement of the ears over the rolls when the husks are first gripped by the husking rolls. In many instances, the ears may be pulled backwards by the husks which causes them to interfere with incoming ears relative to their contact with the husking rolls. Often this results in the ears flowing through the husk box or husking mechanism without sufficient contact with the husking rolls thereby resulting in their being discharged at the opposite end in a semi-husked or unhusked condition.

It is, therefore, one of the objects of this invention to provide a husking mechanism having a plurality of pairs of husking rolls mounted on an elongated frame which are fed unhusked ears of corn from a discharge end of a delivery unit mounted above the husking rolls. Provision is made for relative movement between the delivery unit and the husking rolls whereby the individual pairs of husking rolls will successively receive the ears gravitating from the delivery unit. In this manner the husking rolls which have ears on them are separated from the unit immediately after receiving unhusked ears thereby preventing their interference with incoming ears issuing from the unit.

It is also an object of this invention to provide a new type husking mechanism comprising a number of pairs of husking rolls journaled in a suitable frame and forming a cylindrical structure with the pairs of husking rolls spaced equally radially from the axis of the cylinder. Unhusked ears of corn are delivered to the center of the cylindrical structure and the cylindrical structure is driven rotatably about its axis as well as the individual husking rolls. Means are provided for gripping the ears of corn and positioning them adjacent to a pair of husking rolls and to permit the husking rolls to drive the husks outwardly of the cylindrical structure.

Still a further object of the invention is to provide with the above type of husking mechanism a driving mechanism which will operate to rotate the cylindrical structure as well as the individual husking rolls from a single power source.

Also an object of the invention is to provide suitable means for discarding the husks from the husking mechanism as well as suitable means for collecting incidental kernels of corn separated during the husking operation.

Other objects and advantages of the invention will become apparent to those skilled in the art upon a complete understanding of the invention herein described and shown in the accompanying drawings.

Fig. 1 is an end view of the husking mechanism.

Fig. 3 is a sectional view taken along the lines 3—3 of Fig. 2.

Fig. 4 is a sectional view taken along the lines 4—4 of Fig. 2.

Figure 2:
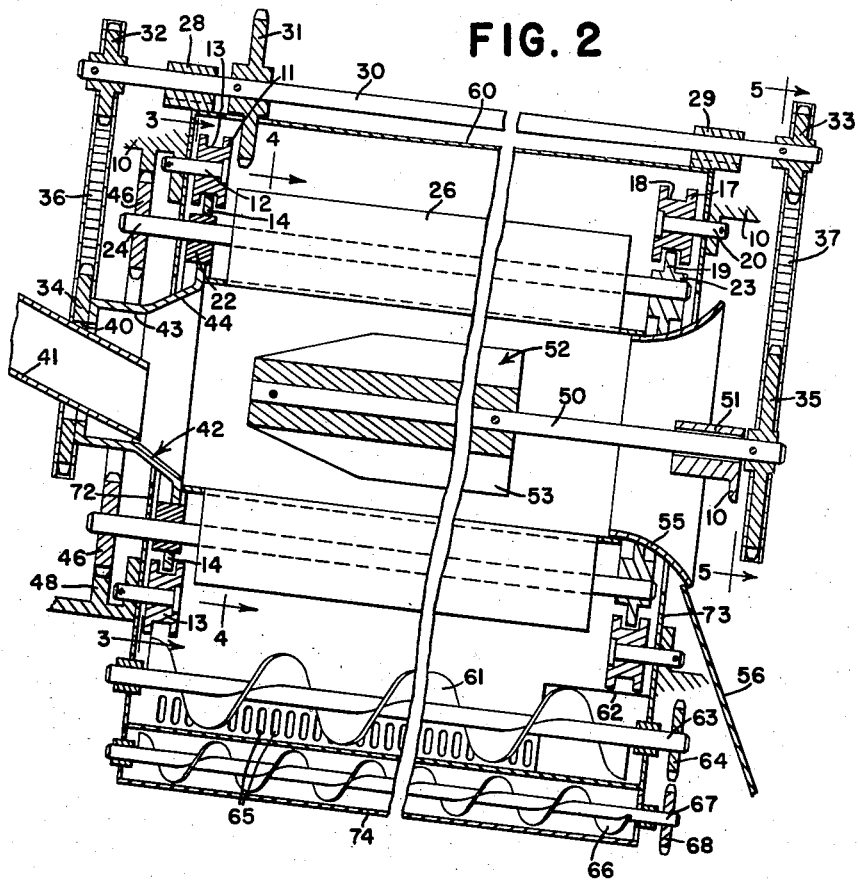
Fig. 2 is a sectional view taken along the lines 2—2 of Fig. 1.
Figure 5:
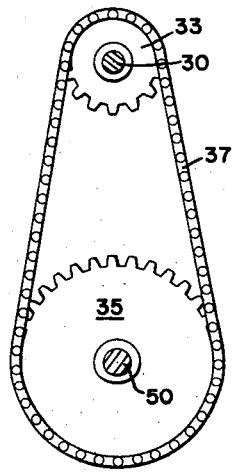
Fig. 5 is a sectional view taken along the lines 5—5 of Fig. 2.

The husking mechanism is supported as a whole on a main frame 10 which may be a part of the main frame of a corn picker or which may serve to support the husking mechanism as a single unit. Whether the husking unit operates as a single unit or as a part of a corn harvesting implement is of no importance for the moment other than to have it understood that it may operate in either capacity. Mounted at one end of the elongated main frame 10 are a plurality of roller guides 11, each being rotatably mounted on the frame 10 by stub shafts 12. Each of the roller guides 11 has an annular slot 13 cut in its outside periphery for receiving an annular guide ring 14. The roller guides 11 are angularly spaced about the annular guide ring 14, as shown in Fig. 3 and, therefore, serve to maintain the annular ring 14 in alinement with its axis. Similarly, at the rear end of the elongated frame 10 are angularly spaced apart roller guides 17, each having an annular slot 18 for receiving an annular guide ring 19. The roller guides 17 are mounted on the frame 10 by means of short stub shafts 20. Integral with the annular rings 14 and 19 and radially inwardly thereof are axially enlarged portions 22 and 23 respectively which are suitably apertured to receive opposite ends of a plurality of pairs of husk roll shafts 24, 25 which extend substantially the length of the husking mechanism and which depend upon the annular rings 14, 19 for their support. Fixed to the husk roll shafts 24, 25 are husk rolls 26, 27, respectively. The husk rolls 26, 27 are of conventional type and details of such are not needed for a full understanding of the present invention and are, therefore, omitted.

A drive shaft 30 is supported on the frame 10 by means of axially spaced apart journals, indicated at 28 and 29, and extend the length of the husking mechanism. Keyed to the shaft 30 is a drive member, here shown as a drive sprocket 31, which is driven from an outside power source. Keyed to the opposite ends of the drive shaft 30 are sprockets 32 and 33 respectively which operate, upon rotation of the shaft 30, to drive the sprockets 34, 35 through the media of chains 36 and 37, respectively. The sprocket 34 is characterized by having a solid body portion with a large opening 40 in its center through which the discharge end of an unhusked ear delivery unit 41 may be projected. Fixed to the inner surface of the body portion of the sprocket 34 is a flanged member 42 having an axially inwardly extending portion 43 continuing in a cone shaped portion 44 which is fixed at its inner end, as by welding or other suitable means, to the inner surface of the annular ring 22. The sprocket 34 is, therefore, also afforded its support by the roller guides 11. In the same vein, rotation of the shaft 30 will also cause rotation of the annular ring 14 which will result in the entire cylindrical structure, composed of the plurality of pairs of husking rolls, rotating about the axis of the cylinder.

Fixed to the forward end of the husk row shafts 24 and 25 are a pair of cooperating spur gears 46 and 47, respectively. Provided in meshed relation with the spur gears 46 is a fixed internal gear 48. The spur gears 47 are spaced inwardly from the internal gear 48 (see Fig. 3). As the cylindrical structure rotates about its axis, the internal gear 48 will act as a drive gear causing the spur gears 46 to rotate which in turn will cause the spur gears 47 to rotate about the axis of the shafts 25. Thus, the husking rolls 26, 27 will rotate in response to rotation of the cylindrical structure.

The sprocket 35 is fixed to a shaft 50 which is coaxial with the axis of the cylindrical structure. The shaft 50 is supported and journaled to the main frame 10 as indicated by the reference numeral 51. Fixed to the forward end of the shaft 50 is an ear gripping member 52 having a plurality of radially extending arms 53, the number corresponding to the number of pairs of husking rolls composing the cylindrical structure. The central portion of the ear gripping member 52 is solid and the arms 53 are curved to form an ear-receiving pocket or opening 54 spaced radially from the axis of rotation and adjacent to the husking rolls 26 and 27. The arms 53 are tapered to their forward ends, the reason obviously being to permit the unhusked ears of corn exiting from the discharge end of the deilvery unit 41 to seat in the openings 54. Positioned at the rear end of the husking mechanism, spacedly from the shaft 50, is a funnel shaped member 55. As will later become apparent the husked ears of corn are discharged through this funnel and are guided to a suitable container or conveyor, not shown, by means of a shield 56 mounted under the lower lip of the funnel 55.

The husking mechanism, other than the gears is encased in a husking unit housing 60 which surrounds the cylindrical structure in its axial dimension. The lower portion of the housing 60 is formed to a V-shaped cross section having its apex curved to form an auger trough. The sides of the V-shaped portion act as a hopper for directing husks being removed from the ears of corn to to husk discharge auger 61, which is mounted at the bottom of the hopper, to be conveyed to the rear of the husking mechanism where they are discharged through an opening 62 in the side of the housing 60. The auger 61 is mounted on an auger drive shaft 63 which is driven by an auger drive sprocket 64. The lower portion of the housing 60 is slotted as at 65 to permit incidental kernels of corn which are removed from the ear in the husking operation to pass through and to be conveyed out of the husking mechanism and to a suitable collecting unit by a second auger 66. The auger 66 is mounted on an auger driver shaft 67 which is driven by a drive sprocket 68. End plates 72, 73 cooperate with the housing 60 to enclose the ends of the husking mechanism and to support the augers 61 and 66 through suitable journals fixed in the end plates. The sprockets 64 and 68 are driven by suitable drive means, not shown, which receives its power from the outside power source which is used to drive the main drive shaft 30. Fixed, as by welding, to the lower portion of a housing 60 is the second auger housing 74, the purpose of which is obvious.

The husking mechanism operates in the following manner. As previously mentioned unhusked ears of corn are delivered to the husking mechanism from the discharge end of the delivery unit 41 internally of the cylindrical structure. The cylindrical structure is driven as a unit in a clockwise direction as indicated by the arrow A (Fig. 1) by the sprocket and chain drive 32, 34, 36. This rotation causes the internal drive gear 48 to drive the spur gears 46 in a counterclockwise direction as indicated by the arrow A2 which in turn creates clockwise rotation of the spur gears 47. Thus the adjacent portions of the husking rolls 26, 27 are caused to move outwardly. Rotation of the cylindrical structure will move the individual pairs of husking rolls successively under the discharge end of the delivery unit where the ears of corn will be gripped by the ear holding member 52 and held in engagement with the respective adjacent pair of husking rolls. It will be noted that the chain and sprocket drives 32, 34, 36 and 33, 35, 37 are the same size and, being driven from a single drive shaft 30, will operate at the same rate of rotation. The ear gripping member 52 will, therefore, rotate about the axis of the cylindrical structure at the same rate that the cylindrical structure itself rotates and, therefore, the ears of corn in the pockets or openings 54 will be held in the same position relative to the husking rolls. The husking rolls 26, 27 operate to drive the husks externally of the cylindrical structure to be directed by the housing 60 to the auger 61 where they are eventually discharged from the husking unit by the auger conveyor 61. It will be noted that the axis of rotation is inclined to the horizontal, the purpose being to cause a gravitational flow of the ears of corn through the husking mechanism. It should, however, be understood that the husking mechanism could be placed horizontally and the husking rolls spirally formed to drive the ears of corn from the forward end to the rearward end or discharge end of the husking mechanism.

Figure 6:
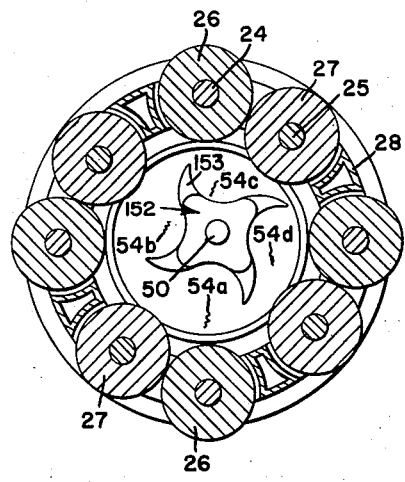
Fig. 6 is a view similar to Fig. 4 showing a modification of the invention.

Details of one modification of the invention are shown in Figure 6. In this modification the outer cylindrical structure is identical to that shown in the previous form, consequently reference numerals and other details of the cylindrical structure are identical and a detailed description will not be repeated. Featured in this form of the invention is a reduced sized ear gripping member 152, the purpose of its reduced size being to permit it to be mounted eccentrically to the cylindrical structure. The ear gripping member 152 is provided with radially extending arms 153 which form pockets 54a, 54b, 54c, and 54d in which to receive ears of corn and to maintain the ears in engagement with the corresponding adjacent pair of husking rolls 26 and 27. The object of moving the ear gripping member 152 eccentric to the cylindrical structure is to provide a relatively large ear receiving space, as would occur in the pockets 54a and 54b, when the unhusked ears of corn are initially received from the delivery unit, and to progressively reduce the space or area between the gripping member 152 and the husking rolls 26, 27 as the outer and loose husks are removed from the ears. In this manner, as the ears of corn are driven by the ear gripping member 152 to the position equivalent to the pockets 54c and 54d, the outer husks are removed leaving only those husks adjacent to the corn left on the ear. By reducing the area of the pockets the ears are then forced into a more limited space and are thus held in more aggressive engagement with the adjacent husking rolls. Details of the drive mechanism of the modification shown in Fig. 6 are identical to that of the previous form of the invention and do not bear repeating.

Figure 7:
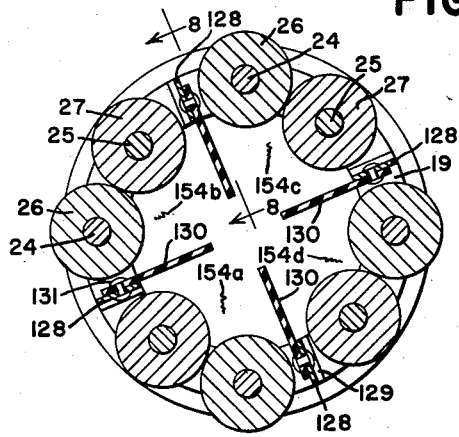
Fig. 7 is a view similar to Fig. 4 showing a second modification of the invention.
Figure 8:
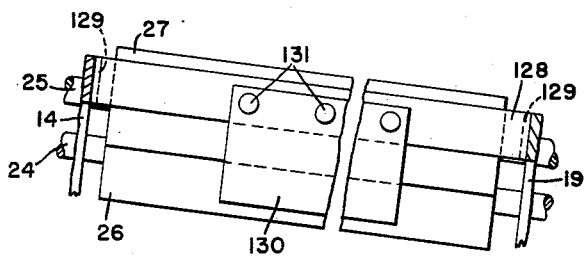
Fig. 8 is a sectional view taken along lines 8—8 of Fig. 7.

In the modification shown in Figs. 7 and 8, husk rolls 36, 27 are mounted on respective husk roll shafts 24, 25 which in turn are supported on axially spaced apart annular rings 14, 19. The cylindrical structure is mounted on the frame in a manner similar to, and is driven in a manner similar to that previously described relative to the first form of the invention. Extending between the annular rings 14, 19 and spaced between the pairs of husking rolls are rigid elongated frame members 128 which are flanged at opposite ends, as at 129. The flanges 129 are fixed to the adjacent annular ring 14, 19 in any suitable manner. Mounted on the frame members 128 are radially inwardly extending wall members 130. The wall members 130, in the sense that they extend radially inwardly, also converge upon one another to form pockets 154a, 154b, 154c, and 154d adjacent to the intake side of the corresponding pairs of husking rolls. The wall members 130 are mounted on the respective frameworks 128 by means of rivets 131. The wall members 130 are of a flexible material, in the particular instance a rubberized fabric, and as such will yield upon an overload of corn being placed in the pockets 154a–154d, or upon enlarged foreign matter entering the husking cylinder.

In the latter modification unhusked ears of corn are fed, as previously described to the lower pair of husking rolls to be seated in the pocket 154a, assuming for the moment that the cylindrical structure is in a position as shown in Fig. 7. Upon rotation of the cylindrical structure the pocket 154a will be moved from under the discharge end of the delivery unit and the next successive pair of husking rolls will move under the discharge end. As the cylindrical structure causes the ears of corn to be moved upwardly the flexible wall members 130 will cause the ears of corn to be held in its pocket and in engagement with the husking rolls and will also prevent the ears from dropping to the lower husking rolls. Other driving operations and details of the husking mechanism as shown in Figs. 7 and 8 are similar to that previously described with the exception, of course, that the ear gripping member 52 and its associated drive means have been eliminated in the modification. Details of the mechanism, other than those already described are therefore unnecesssary and thus have been omitted.

While only two modifications of the invention have been shown, it should be recognized that other forms and variations could exist without departing basically from the broad general principles herein disclosed. It should, therefore, be understood that while the preferred embodiments of the invention have been described with the view of clearly and concisely illustrating its principles, it is desired not to so limit or narrow the invention beyond that which is claimed.

What is claimed is:

1. A corn husking mechanism comprising; a main frame; an elongated supporting framework rotatably mounted on the main frame for movement about an axis of rotation; a cylindrical structure concentric with the axis of rotation and composed of a plurality of pairs of husking rolls mounted on the supporting framework, each pair being equally radially spaced relative to the axis; a rotatable ear holding member mounted on the frame and coaxial with the aforesaid axis of rotation, the ear holding member having a plurality of ear engaging portions adapted to maintain the ears radially from the axis of rotation and in engagement with the pairs of husking rolls; means delivering unhusked ears of corn to the ear engaging portions; drive means mounted on the frame and operative to rotate the cylindrical structure about its axis of rotation and the ear holding member in unison with the cylindrical structure, and to rotate the husking rolls to cause the husks to be removed from the ears and to be driven outwardly of the cylindrical structure.

2. A corn husking mechanism comprising; a main frame; an elongated supporting framework rotatably mounted on the main frame for movement about an axis of rotation inclined to the horizontal; a cylindrical structure concentric with the axis of rotation and composed of a plurality of pairs of husking rolls mounted on the supporting framework, each pair being equally radially spaced relative to the axis and having upper and lower ends; a rotatable ear holding member mounted on the frame internally of the cylindrical structure, the ear holding member having a plurality of ear engaging portions adapted to maintain the ears radially from the axis of rotation and in engagement with the pairs of husking rolls; means delivering unhusked ears of corn to the ear engaging portions and at the upper ends of the husking rolls; drive means mounted on the frame and operative to rotate the cylindrical structure about its axis of rotation and the ear holding member in unison with the cylindrical structure, and to rotate the husking rolls to cause the husks to be removed from the ears and to be driven outwardly of the cylindrical structure as the ears gravitate from the upper to the lower ends.

3. A corn husking mechanism comprising: an elongated frame; a cylindrical structure rotatably mounted on the frame and composed of angularly spaced pairs of husking rolls extending between opposite ends of the frame; a delivery unit having a discharge end positioned to deliver unhusked ears of corn to the husking rolls centrally of the cylindrical structure; means mounted on the frame operative to rotate the cylindrical structure whereby the individual pairs of husking rolls will successively receive the ears from the delivery unit; means on the frame forming ear holding pockets associated with and internally of the husking rolls for maintaining engagement of the ears with the rolls, said latter means including additional means causing said pockets to rotate in unison with the cylindrical structure; husk roll drive means supported on the frame operative to rotate the rolls to drive the husks outwardly of the structure; and means beneath the cylindrical structure for receiving the husks.

4. A corn husking mechanism comprising: an elongated frame; a cylindrical structure rotatably mounted on the frame and composed of a plurality of angularly spaced pairs of husking rolls extending between opposite ends of the frame; a delivery unit having a discharge end positioned to deliver unhusked ears of corn to the husking rolls and internally of the structure; drive means mounted on the frame operative to rotate the cylindrical structure whereby the individual pairs of husking rolls will successively receive the ears from the delivery unit; an ear engaging member rotatably mounted on the frame associated with and spaced from the husking rolls for limiting movement of the ears away from the rolls; means operative from the aforesaid drive means to rotate the member in unison with the cylindrical structure; a gear fixed to the frame concentric with the cylindrical structure; and husk roll drive means associated with each pair of husking rolls including therein a gear meshable with the aforesaid gear and operative upon rotation of the cylindrical structure to rotate the individual rolls for removing and driving the husks outwardly of the structure.

5. A corn husking mechanism comprising: an elongated frame; a cylindrical structure rotatably mounted on the frame and composed of a plurality of angularly spaced pairs of husking rolls extending between opposite ends of the frame; a delivery unit having a discharge end positioned to deliver unhusked ears of corn to the husking rolls and internally of the structure; drive means mounted on the frame operative to rotate the cylindrical structure whereby the individual pairs of husking rolls will successively receive the ears from the delivery unit; an ear engaging member rotatably mounted on the frame associated with and spaced from the husking rolls for limiting movement of the ears away from the rolls; means operative from the aforesaid drive means to rotate the member in unison with the cylindrical structure; a gear fixed to the frame concentric with the cylindrical structure; husk roll drive means associated with each pair of husking rolls including therein a gear meshable with the aforesaid gear and operative upon rotation of the cylindrical structure to rotate the individual rolls for removing and driving the husks outwardly of the structure; a husk conveyor mounted under the structure for moving the husks outwardly of the husking mechanism; and a housing surrounding the structure for collecting the husks driven outwardly of the structure and depositing them in the husk conveyor.

6. The invention defined in claim 5 in which the husk conveyor is in the form of an auger and the housing includes an under portion positioned under the auger, the under portion being characterized by having openings therein permitting incidental kernels of corn to gravitate to a corn conveyor positioned below said husk conveyor and under portion.

7. The invention defined in claim 3, in which the means forming ear holding pockets is in the form of elongated members connected to the frame positioned radially inwardly of the cylindrical structure and forming a plurality of elongated pockets equal in number to the pairs of husking rolls, each pocket being associated with and spaced proximate to a respective pair of husking rolls and adapted to receive ears of corn and to hold the ears in engagement with the adjacent pair of rolls.

8. The invention defined in claim 3, in which the means forming ear holding pockets is in the form of a rigid member internally positioned relative to the cylindrical structure and having on its outer surface a number of angularly spaced and diverging portions which form the ear-holding pockets between the member and the pairs of husking rolls.

9. The invention defined in claim 8, in which said member is rotatably mounted on the frame and is driven to move in unison with and at the same rate of rotation as said adjacent pairs of husking rolls thereby maintaining the ear of corn in engagement with said pairs of husking rolls throughout the husking operation.

10. The invention defined in claim 9, in which said member is eccentric to the cylindrical structure to provide relatively larger ear-receiving pockets when the ears are received from the delivery unit and to progressively reduce the size of the pockets as the husks are removed from the ears.

11. The invention defined in claim 3, in which the means forming the pockets is in the form of a plurality of elongated wall members, and each pocket is formed by a pair of said wall members being positioned in convergent relationship to one another and on the intake side of a pair of husking rolls.

12. The invention defined in claim 11, in which said wall members are composed of a flexible material adapted to yield upon an overload of corn or other foreign matter entering the pocket.

References Cited in the file of this patent

UNITED STATES PATENTS

| | | |
|---|---|---|
| 45,387 | Case | Dec. 13, 1804 |
| 718,462 | Ielfield | Jan. 13, 1903 |
| 1,201,476 | Leister et al. | Oct. 17, 1916 |
| 1,400,352 | Forry | Dec. 13, 1921 |
| 1,463,364 | Knapp | July 31, 1923 |
| 2,686,522 | Dort | Aug. 17, 1954 |